United States Patent
Sethia et al.

(10) Patent No.: US 9,652,262 B2
(45) Date of Patent: May 16, 2017

(54) OPERATION PARAMETER CONTROL BASED UPON QUEUED INSTRUCTION CHARACTERISTICS

(71) Applicant: THE REGENTS OF THE UNIVERSITY OF MICHIGAN, Ann Arbor, MI (US)

(72) Inventors: Ankit Sethia, Ann Arbor, MI (US); Scott Mahlke, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 218 days.

(21) Appl. No.: 14/510,440

(22) Filed: Oct. 9, 2014

(65) Prior Publication Data

US 2016/0103691 A1 Apr. 14, 2016

(51) Int. Cl.
G06F 9/30 (2006.01)
G06F 9/40 (2006.01)
G06F 9/445 (2006.01)
G06F 1/32 (2006.01)
G06F 9/48 (2006.01)

(52) U.S. Cl.
CPC .......... *G06F 9/44505* (2013.01); *G06F 1/329* (2013.01); *G06F 9/30* (2013.01); *G06F 9/4893* (2013.01); *Y02B 60/144* (2013.01)

(58) Field of Classification Search
None
See application file for complete search history.

(56) References Cited

U.S. PATENT DOCUMENTS

| | | | | |
|---|---|---|---|---|
| 7,321,965 B2* | 1/2008 | Kissell | .................. | G06F 8/4442 712/229 |
| 2009/0158012 A1* | 6/2009 | Hansen | ..................... | G06F 9/30 712/222 |
| 2011/0276760 A1* | 11/2011 | Chou | ..................... | G06F 9/3004 711/118 |
| 2013/0086328 A1* | 4/2013 | Frank | .................. | G06F 12/0875 711/125 |
| 2013/0179662 A1* | 7/2013 | Choquette | ............. | G06F 9/3887 712/206 |

OTHER PUBLICATIONS

International Search Report and Written Opinion of the International Searching Authority mailed Jan. 12, 2016 in PCT/US2015/053771, 12 pages.

(Continued)

*Primary Examiner* — Michael Sun
(74) *Attorney, Agent, or Firm* — Nixon & Vanderhye P.C.

(57) ABSTRACT

This follows a data processing system comprising multiple GPUs includes instruction queue circuitry storing data specifying program instructions for threads awaiting issue for execution. Instruction characterization circuitry determines one or more characteristics of the program instructions awaiting issue within the instructional queue circuitry and supplies this to operating parameter control circuitry. The operating parameter control circuitry alters one or more operating parameters of the system in response to the one or more characteristics of the program instructions awaiting issue.

19 Claims, 10 Drawing Sheets

(56) References Cited

OTHER PUBLICATIONS

O. Kayiran et al, "Neither More Nor Less: Optimizing Thread-level Parallelism for GPGPUs" IEEE Proceedings of the 22$^{nd}$ International Conference on Parallel Architectures and Compilation Techniques, Sep. 2013, pp. 157-166.

T.G. Rogers et al, "Cache-Conscious Wavefront Scheduling" 2012 IEEE/ACM 4$^{th}$ Annual International Symposium on Microarchitecture, Dec. 2012, pp. 72-83.

X. Mei et al, "A Measurement Study of GPU DVFS on Energy Conservation" HotPower '13 Proceedings of the Workshop on Power-Aware Computing and Systems Article No. 10, Nov. 2013, 5 pages.

J. Lee et al, "Improving Throughput of Power-Constrained GPUs Using Dynamic Voltage/Frequency and Core Scaling" 2011 International Conference on Parallel Architectures and Compilation Techniques, Oct. 2011, pp. 111-120.

S. Li et al, "McPAT: An Integrated Power, Area, and Timing Modeling Framework for Multicore and Manycore Architectures" MICRO'09, 42$^{nd}$ Annual IEEE/ACM International Symposium on Microarchitecture, Dec. 2009, pp. 469-480.

Nvidia Corporation, "Nvidia GPU Boost for Tesla " Jan. 2014, retrieved from http://www.nvidia.com/content/PDF/kepler/nvidia-gpu-boost-tesla-k40-06767-001-v02.pdf, 16 pages.

Q. Deng et al, "MultiScale: Memory System DVFS with Multiple Memory Controllers" ISLPED'12, Proceedings of the 2012 ACM/IEEE International Symposium on Low Power Electronics and Design, Jul. 2012, pp. 297-302.

Majeed et al., "Warped Register File: A Power Efficient Register File for GPGPUs", *Electrical Engineering Dept.*, University of Southern California, 2013—IEEE, 12 pgs.

Bakhoda et al., "Analyzing CUDA Workloads Using a Detailed GPU Simulator", University of British Columbia, 2009—IEEE, 12 pgs.

Brooks et al., "Dynamic Thermal Management for High-Performance Microprocessors", Princeton University, 2001—IEEE, pp. 171-182.

Chandrasekar et al., "Improved Power Modeling of DDR SDRAMs", *14$^{th}$ Euromicro Conf. on Digital System Design*, 2011—IEEE, pp. 99-108.

Che et al., "Pannotia: Understanding Irregular GPGPU Graph Applications", *AMD Research and Computer Science*, University of Virginia, 2013—IEEE, pp. 185-195.

Che et al., "Rodinia: A Benchmark Suite for Heterogeneous Computing", *Department of Computer Science*, University of Virginia, 2009—IEEE, pp. 44-54.

Deng et al., "MultiScale: Memory System DVFS with Multiple Memory Controllers", *'ISLPED'12*, Jul. 30-Aug. 1, 2012, 6 pgs.

Deng et al., "Active Low-Power Modes for Main Memory with MemScale", *IEEE Computer Society*, May/Jun. 2012—IEEE, pp. 60-69.

Gebhart et al., "Energy-efficient Mechanisms for Managing Thread Context in Throughput Processors", *'ISCA'11*, Jun. 4-8, 2011, pp. 235-246.

Gilani et al., "Power-efficient Computing for Compute-intensize GPGPU Applications", University of Wisconsin, 2013—IEEE, 12 pgs.

Isci et al., "Live, Runtime Phase Monitoring and Prediction on Real Systems with Application to Dynamic Power Management", *International Symposium on Microarchitecture—IEEE Computer Society (MICRO'06)*, 12 pgs.

Jog et al., "OWL: Cooperative Thread Array Aware Scheduling Techniques for Improving GPGPU Performance", *ASPLOS'13*, Mar. 16-20, 2013, pp. 1-12.

Kayiran et al., "Neither More Nor Less: Optimizing Thread-level Parallelism for GPGPUs", 2013—IEEE, pp. 157-166.

Kim et al., "System Level Analysis of Fast, Per-Core DVFS using On-Chip Switching Regulators", 2008—IEEE, pp. 123-134.

TAP: A TLP-Aware Cache Management Policy for a CPU-GPU Heterogeneous Architecture, 2011—IEEE, 12 pgs.

Lee et al., "Improving Throughput of Power-Constrained GPUs Using Dynamic Voltage/Frequency and Core Scaling", *2011 International Conference on Parallel Architectures and Compilation Techniques, IEEE Computer Society*, 2011—IEEE, pp. 111-120.

Leng et al., "GPUWattch: Enabling Energy Optimizations in GPGPUs", *ISCA'13*, 12 pgs.

Leng et al., "GPUVolt: Modeling and Characterizing Voltage Noise in GPU Architectures", *ISLPED'14*, Aug. 11-13, 2014, 6 pgs.

Mei et al., "A Measurement of Study of GPU DVFs on Energy Conservation", *Department of Computer Science*, Hong Kong Baptist University, No Date, 5 pgs.

Nasre et al., "Data-driven versus Topology-driven Irregular Computations on GPUs", *2013 IEEE 27$^{th}$ International Symposium on Parallel & Distributed Processing*, 2013—IEEE, pp. 463-474.

Rogers et al., "Cache-Conscious Wavefront Scheduling", *2012 IEEE/ACM 45$^{th}$ Annual International Symposium on Microarchitecture, IEEE Computer Society*, 2012—IEEE, pp. 72-83.

Li et al., "McPAT: An Integrated Power, Area, and Timing Modeling Framework for Multicore and Manycore Architectures", University of Notre Dame, Hewlett-Packard Labs, Seoul National University and University of California, San Diego, No Date, pp. 470-480.

Stratton et al., "Parboil: A Revised Benchmark Suite for Specific and Commercial Throughput Computing", *IMPACT Technical Report*, University of Illinois, Mar. 2, 2012, Revision: Mar. 19, 2012, 12 pgs.

\* cited by examiner

* = memory-accessing processing circuitry
# = non-memory-accessing processing circuitry (a) Distribution of total execution time across various invocations for different, statically fixed number of thread blocks for the bfs-2 kernel. No single configuration performs best for all invocations. Each color is a different invocation of the kernel.

(b) Resource requirement for entire execution of the mri-g-1 kernel (a) Adaptiveness of Equalizer across invocations of bfs-2

(b) Adaptiveness of Equalizer within an invocation for spmv

OPERATION PARAMETER CONTROL BASED UPON QUEUED INSTRUCTION CHARACTERISTICS

BACKGROUND

Field

This disclosure relates to data processing systems. More particularly, this disclosure relates to operation parameter control for data processing systems.

Prior Art

Modem GPUs provide several TFLOPs of peak performance for a few hundred dollars. GPUs provide high performance by having hundreds of floating point units (FPUs) and keeping them busy with thousands of concurrent threads. For example, NVIDIA's GTX580 has 512 FPUs and uses over 20,000 threads to maintain high utilization of these FPUs via fine grained multi-threading. Modem GPUs are provided with high memory bandwidth of up to 6 Gbps and 64 kB of local storage per streaming multiprocessor (SM) to feed data to these FPUs.

At full occupancy, more than a thousand, almost identical threads are executing on an SM. Therefore, if one thread has a high demand for using one of the resources of the GPU, then this imbalance in resource requirement is magnified many times causing significant contention.

SUMMARY

Viewed from one aspect the present disclosure provides apparatus comprising:

processing circuitry to process a plurality of threads in a plurality of thread groups, a given thread group comprising a plurality of threads processable in parallel with a common program executable for each thread of said given thread group, wherein said processing circuitry comprises:

issue queue circuitry to store data specifying program instructions of said threads awaiting issue for execution;

instruction characterisation circuitry to determine one or more characteristics of said program instructions awaiting issue; and operating parameter control circuitry to alter one or more operating parameters controlling operation of said apparatus in dependence upon said one or more characteristics.

Viewed from another aspect the present disclosure provides apparatus comprising:

processing means for processing a plurality of threads in a plurality of thread groups, a given thread group comprising a plurality of threads processable in parallel with a common program executable for each thread of said given thread group, wherein said processing circuitry comprises:

issue queue means for storing data specifying program instructions of said threads awaiting issue for execution;

instruction characterisation circuitry for determining one or more characteristics of said program instructions awaiting issue; and operating parameter control means for altering one or more operating parameters controlling operation of said apparatus in dependence upon said one or more characteristics.

Viewed from another aspect the present disclosure provides a method comprising the steps of:

processing a plurality of threads in a plurality of thread groups, a given thread group comprising a plurality of threads processable in parallel with a common program executable for each thread of said given thread group, wherein said processing circuitry comprises:

storing data specifying program instructions of said threads awaiting issue for execution;

determining one or more characteristics of said program instructions awaiting issue; and altering one or more operating parameters controlling operation of an apparatus for processing said plurality of threads in dependence upon said one or more characteristics.

The above, and other objects, features and advantages of this disclosure will be apparent from the following detailed description of illustrative embodiments which is to be read in connection with the accompanying drawings.

DRAWINGS

FIG. 1 schematically illustrates a data pro processing system including multiple GPUs;

FIG. 2 schematically illustrates a GPU;

Figure 5:
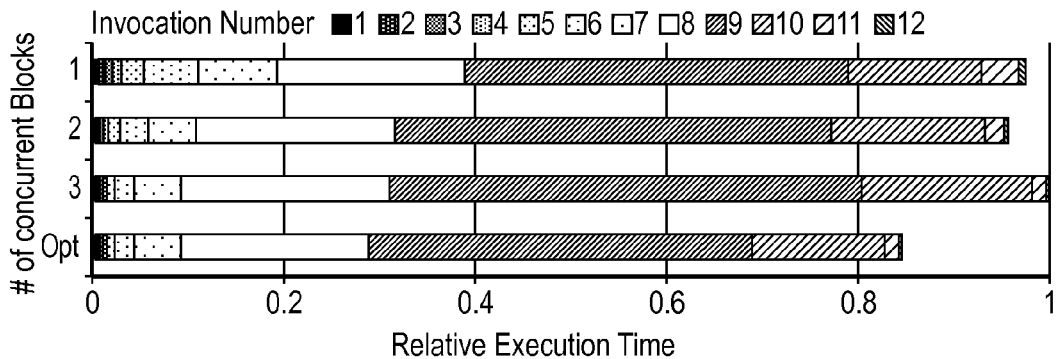
Figure 5:
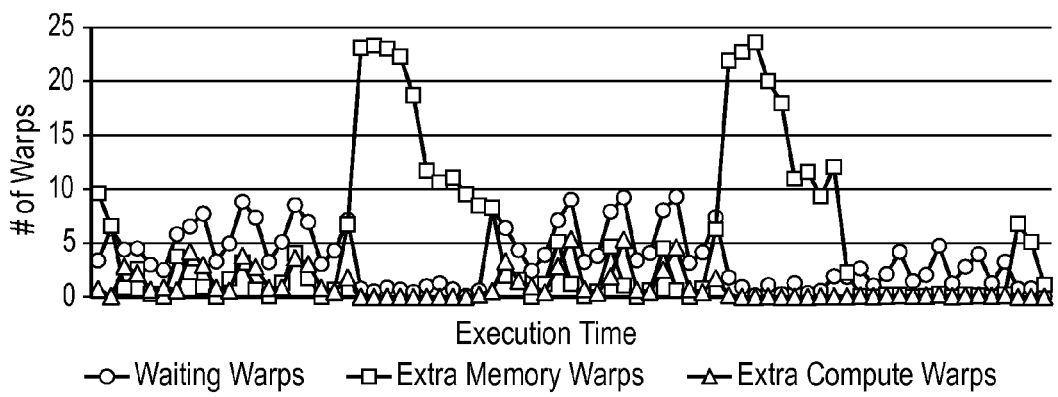
Figure 6:
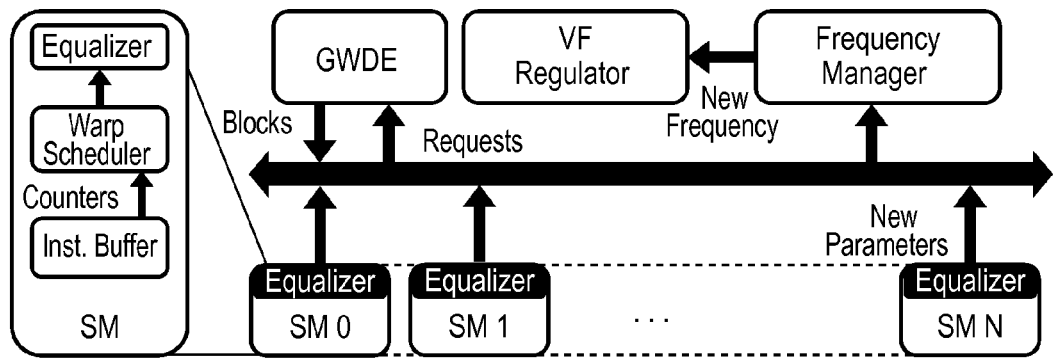
Figure 7:
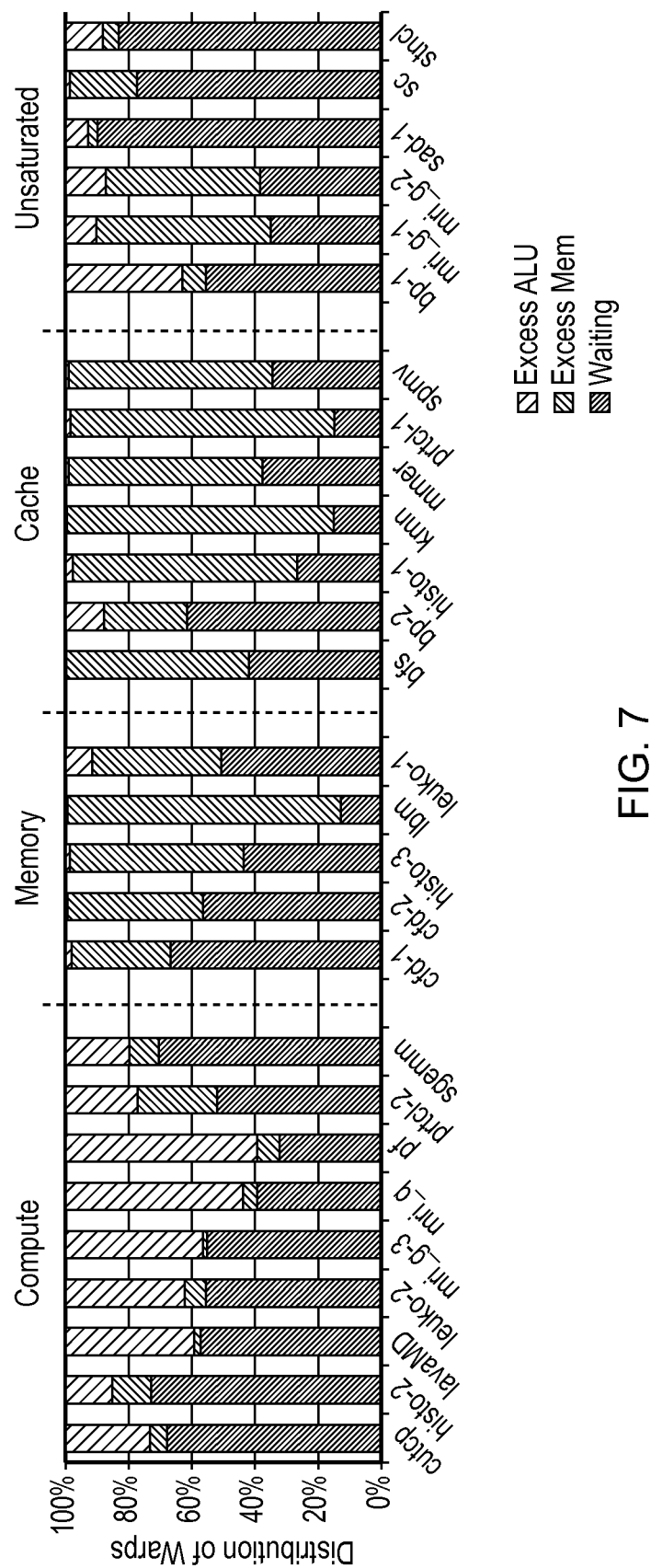
Figure 8:
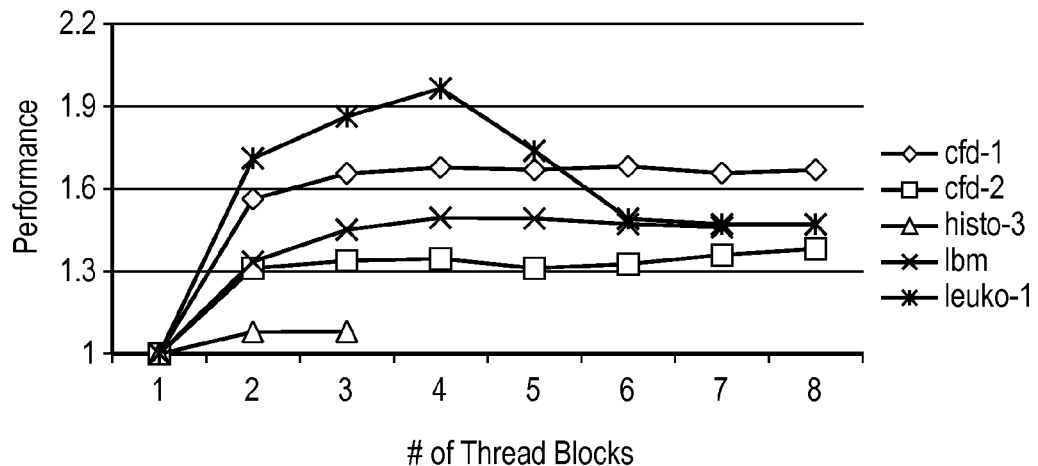
Figure 9:
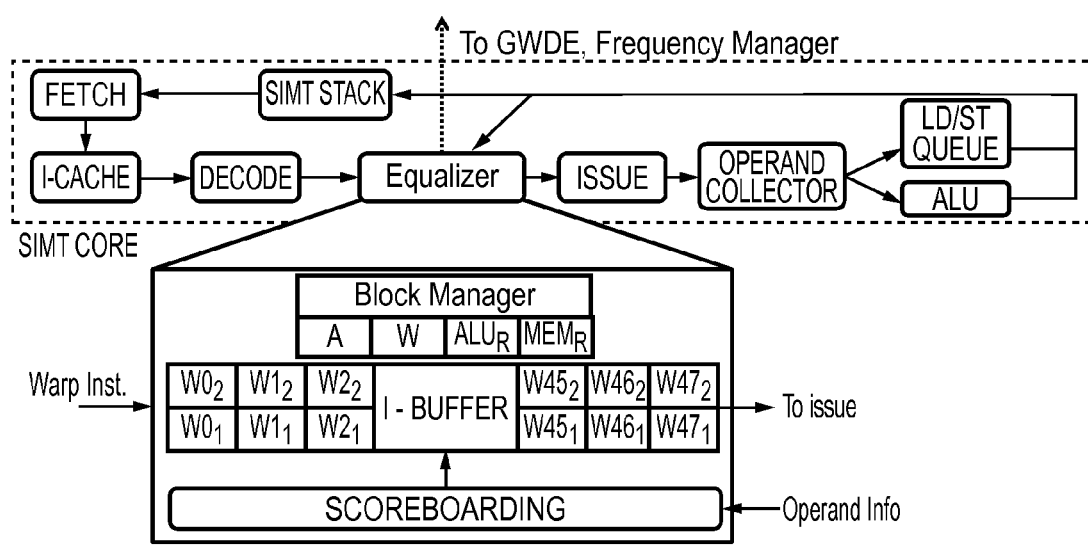
Figure 10:
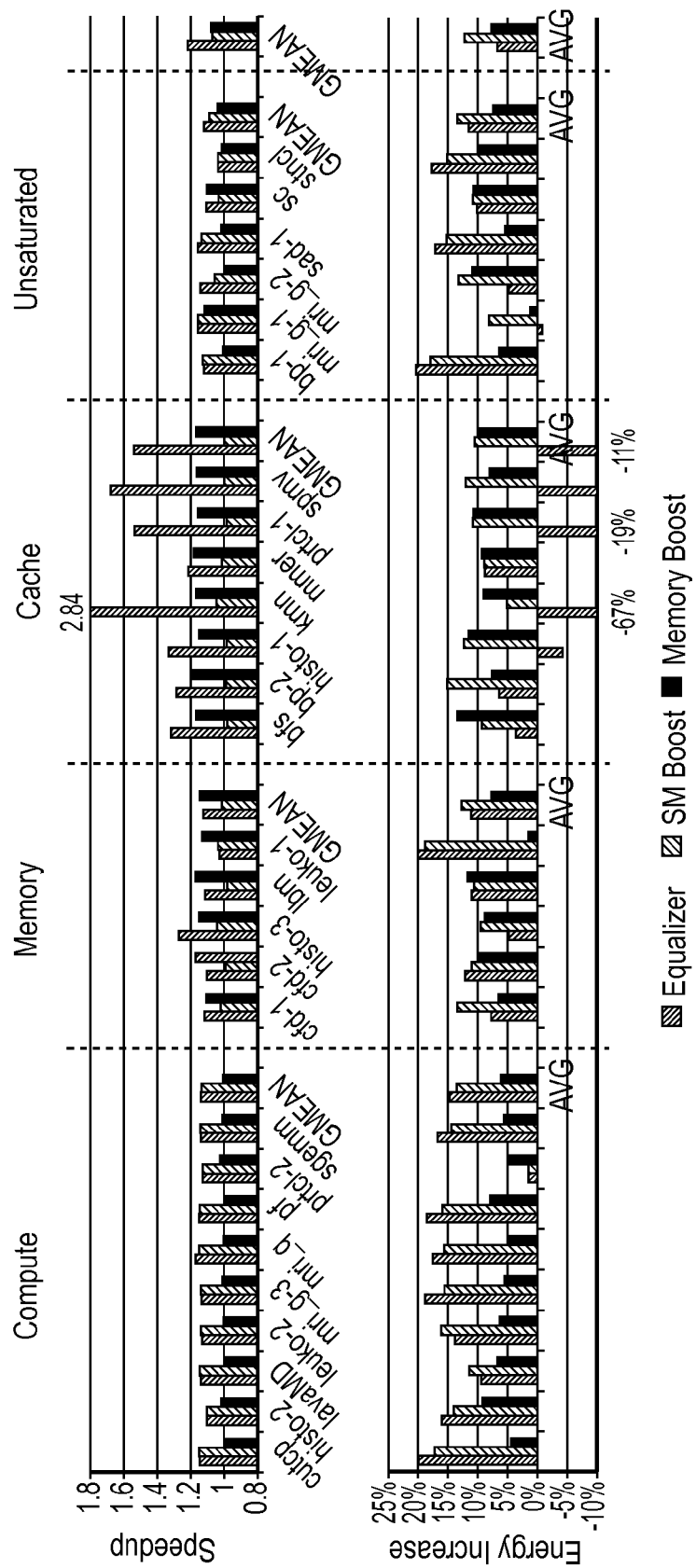
Figure 11:
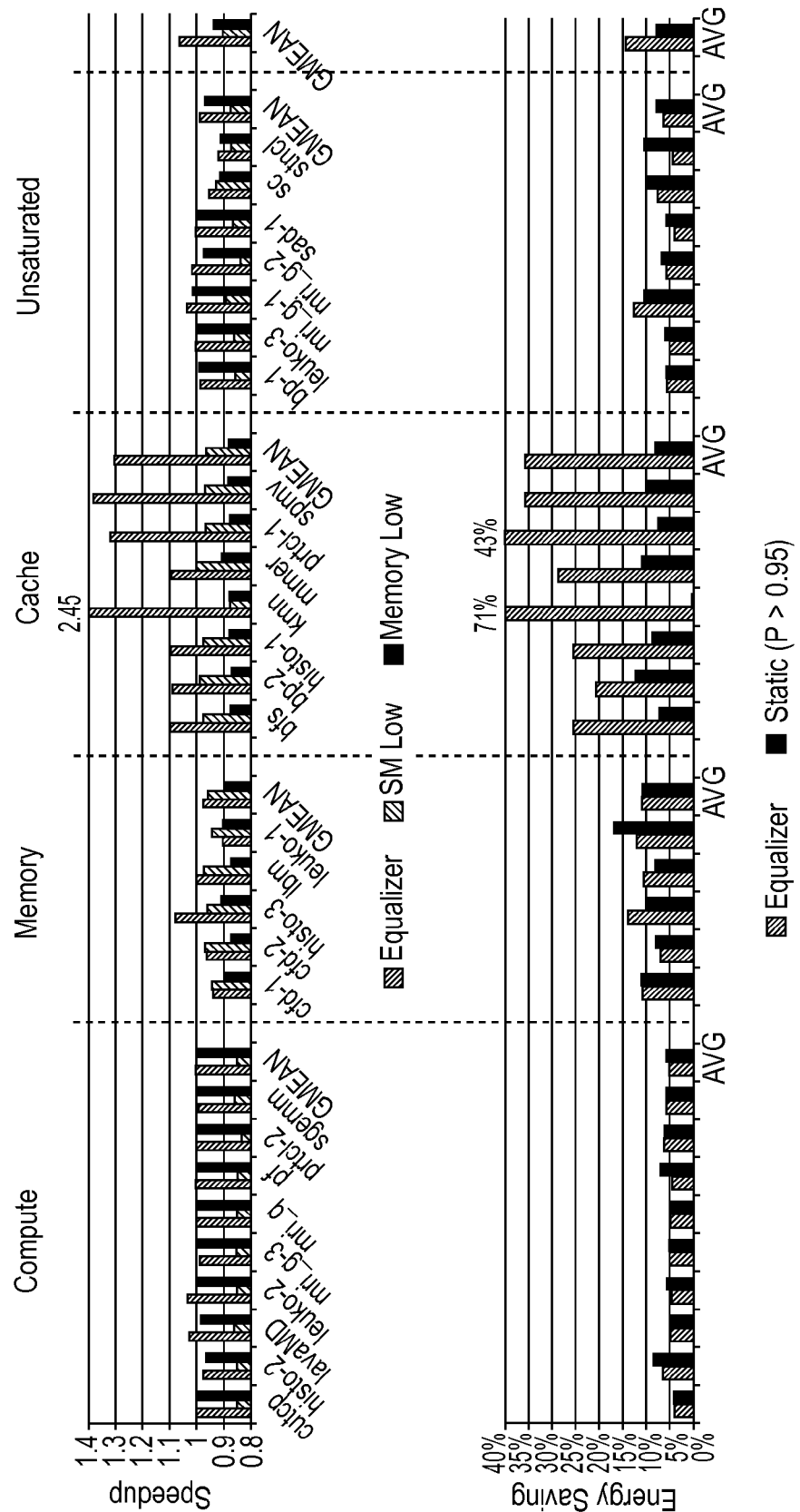
Figure 12:
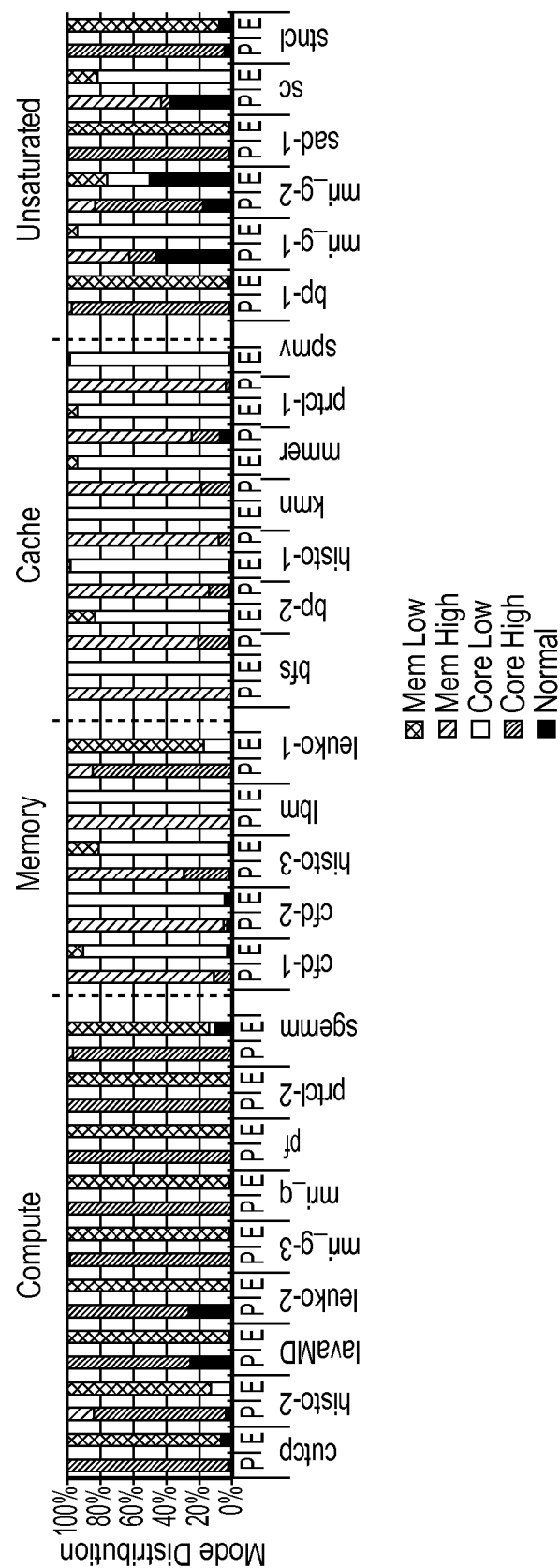
Figure 13:
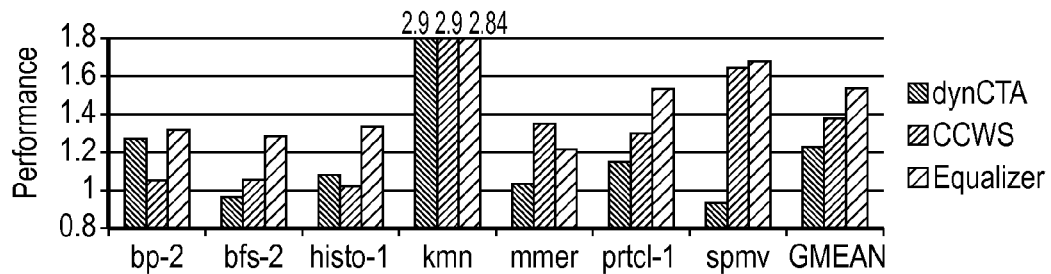
Figure 14:
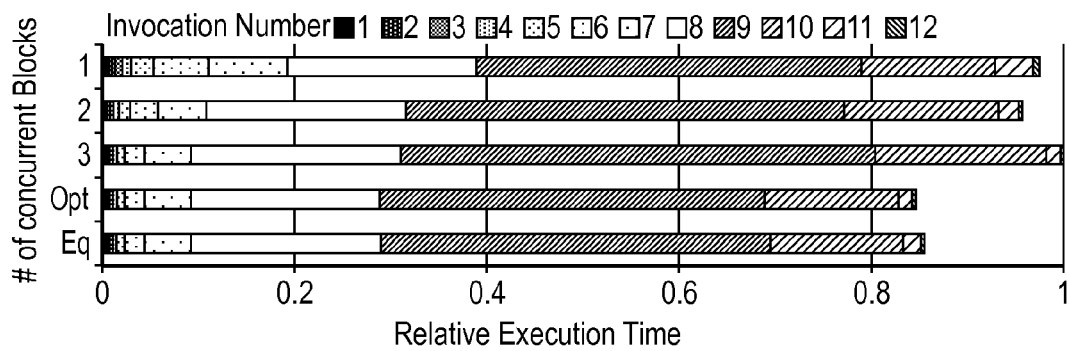
Figure 14:
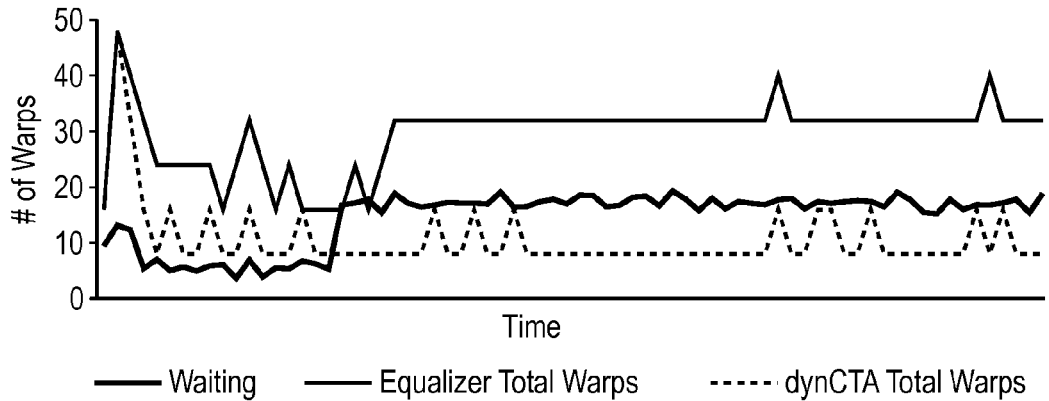

FIG. 5 schematically illustrates variation of kernel requirements across and within kernel instances;

FIG. 6 schematically illustrates an equaliser overview where each SM sends the new thread block and the New SM and memory frequency domain requests, the frequency manager takes the requests and changes the SM or memory frequency as requested by a majority of the SMs and a Global Work Distribution Engine (GWDE) manages the request for new thread blocks;

FIG. 7 schematically illustrates the state of the warps for different categories of kernels with the name on top of the chart showing the category of the kernels;

FIG. 8 schematically illustrates the performance of memory intensive kernels with the number of concurrent thread blocks;

FIG. 9 schematically illustrates an equaliser overview where the equaliser is attached to the instruction buffer and periodically calculates four counter values and at the end of an epoch sends a request to the GWDE;

FIG. 10 schematically illustrates performance and increase in energy consumption for performance mode;

FIG. 11 schematically illustrates performance and energy savings in energy mode where the static bar on the right for energy savings is either SM low or mem low from the top graph when the performance is above 0.95;

FIG. 12 schematically illustrates distribution of time for the various SM and frequency combinations where P and E are data for performance and energy mods respectively;

FIG. 13 schematically illustrates a comparison of equaliser with dynCTA and CCWS; and FIG. 14 schematically illustrates the adaptiveness of the equaliser.

EMBODIMENTS

Figure 1:
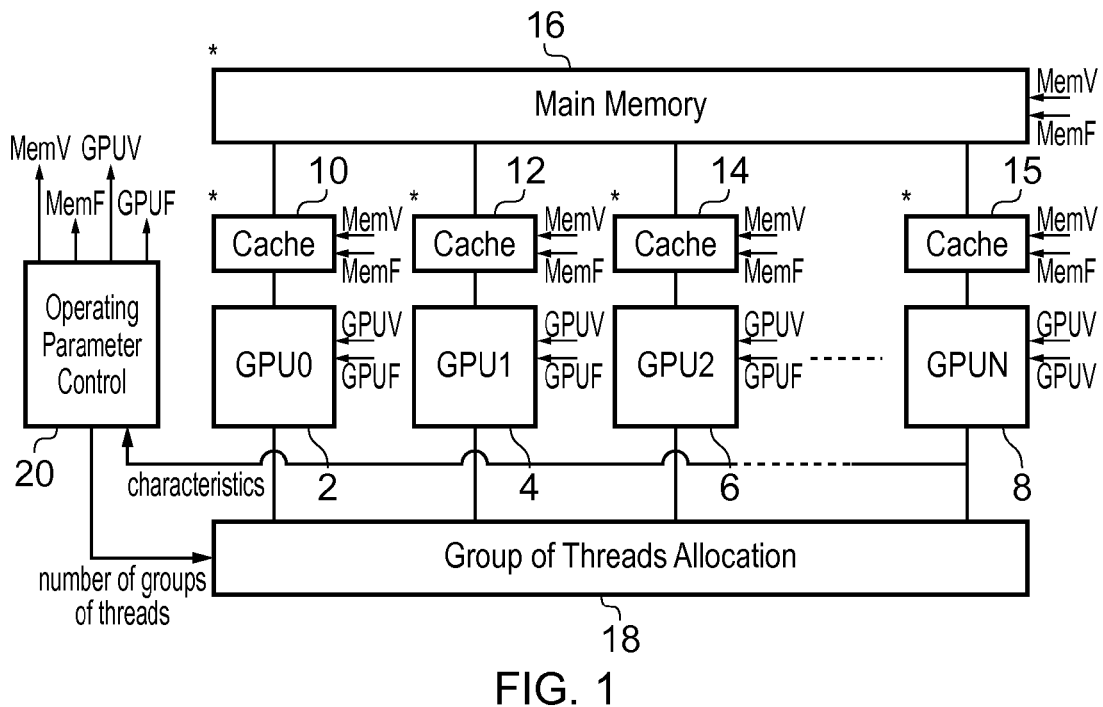

FIG. 1 schematically illustrates a data processing system including multiple GPUs 2, 4, 6, 8. Each of these GPUs 2, 4, 6, 8 is provided with a local cache memory 10, 12, 14, 16, via which it is coupled to a main memory 16. Each of the GPUs 2, 4, 6, 8 comprises processing circuitry which serves to process a plurality of threads arranged in a plurality of thread groups with a given thread group comprising a plurality of threads processable in parallel with a common program executable for each thread of that group. This processing may be considered to represent multiple data single program (MDSP) processing operation. An example of such a processing operation is sometimes termed warp processing. Allocation circuitry 18 serves to allocate groups of threads to the different GPUs 2, 4, 6, 8.

Each of the GPUs 2, 4, 6, 8, generate instruction characteristics which are supplied to operating parameter control circuitry 20 which periodically uses these to determine whether or not to alter one or more operating parameters of the system of FIG. 1. These operating parameters include an operating voltage of the memory system 10, 12, 14, 15, 16, operating frequency of the memory system, operating voltage of the GPUs 2, 4, 6, 8 and/or and operating frequency of the GPUs. Another operating parameter which may be controlled by the operating parameter control circuitry is a number of different groups of threads which are issued to each of the GPUs 2, 4, 6, 8 at a given time.

Figure 2:
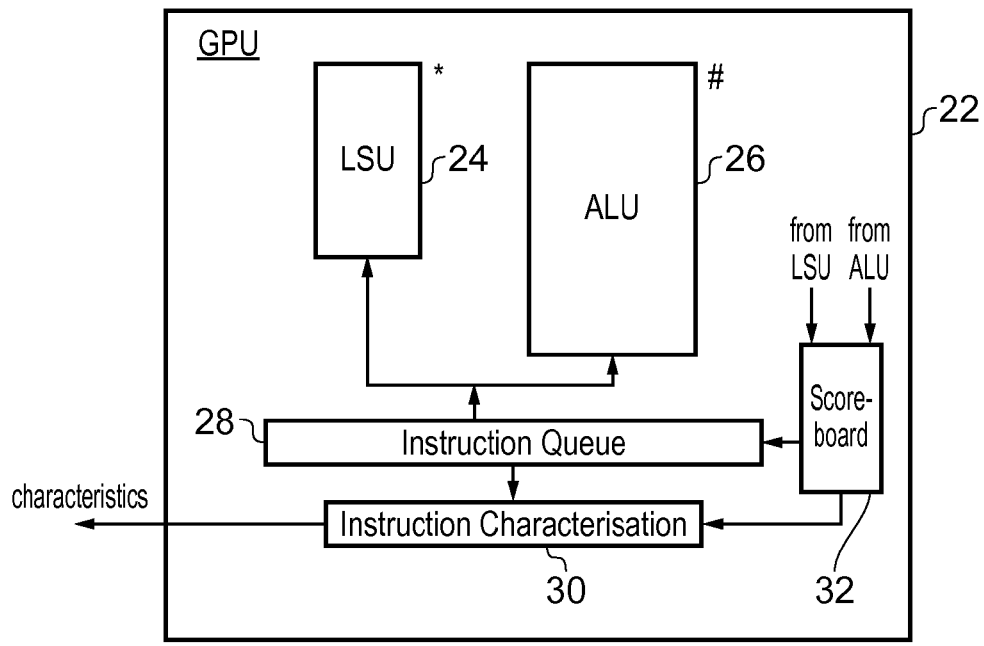

FIG. 2 schematically illustrates a GPU. The GPU 22 includes a load store unit 24 and an arithmetic logic unit 26. Instruction queue circuitry 28 stores data specifying program instructions for the threads that are awaiting issue for execution by either the load store unit 24 or the arithmetic logic unit 26. Instruction characterisation circuitry 30 serves to determine one or more characteristics of the program instructions awaiting issue which are returned to the operating parameter control circuitry 30. The instruction characterisation circuitry 30 is responsive to the data characterising the instructions held within the instruction queue 28, as well as data from a register score boarding circuit 32. As will be familiar to those in this technical field, the score boarding circuit 32 can serve to store data indicating for each register which can serve as an input operand to an instruction whether or not the data value within that register has yet been committed by an already pending program instruction which writes to that register. The data held by the score boarding circuit 32 may also include data indicating whether or not each register is waiting for an operand to be written to it by a pending memory access processing operating. Thus, the score boarding data can be considered to comprise register-ready scoreboard data as well as memory-access score board data. In the context of the examples of FIGS. 1 and 2, the main memory 16, the cache memories 10, 12, 14, 15 and the respective load store units 24 can be considered to form memory-accessing processing circuitry. The arithmetic logic units 26 of the GPUs can be considered to form non-memory-accessing processing circuitry.

Figure 3:
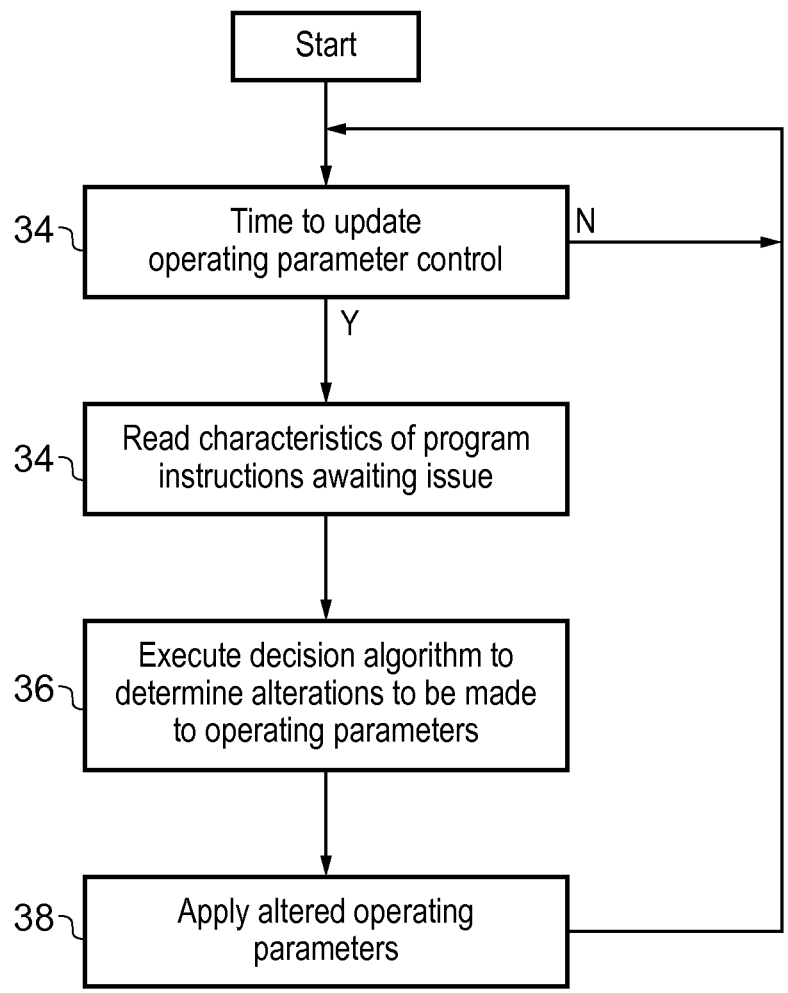
FIG. 3 is a flow diagram schematically illustrating operating parameter control.

FIG. 3 is a flow diagram schematically illustrating processing which may be performed to control operating parameters of the system of FIG. 1. At step 34 processing waits unit it is time to update operating parameter control (e.g. a given time has expired since such control was last performed). At step 36 the operating parameter control circuitry 20 reads characteristics of the program instructions awaiting issue as supplied by the instruction characterisation circuitry 30. At step 36, the operating parameter control circuitry 20 executes a decision algorithm to the determine what, if any, alterations should be made to the operating parameters of the system of FIG. 1. Step 38 then applies any such altered operating parameters and processing returns to step 34.

It is observed that the majority of GPU applications are bottlenecked by the number of compute resources, available memory bandwidth or limited data.

As threads wait to access the bottleneck resource, other resources end up being under-utilized, leading to inefficient execution. While these hardware resources cannot be increased at runtime, there are three important parameters that can modulate the performance and energy consumption of these resources: number of concurrent threads, frequency of the streaming multiprocessor (SM) (e.g. a GPU) and frequency of the memory system. Running the maximum number of threads on an SM causes inefficient execution by saturating the compute resources in compute intensive workloads and memory bandwidth for memory intensive workloads. However, its impact on the data cache of an SM is even more critical. It significantly reduces the usefulness of the limited-capacity L1 data cache. For NVIDIA's Fermi architecture, each SM can have up to 48 kB of data cache resulting in each thread having fewer than 30 bytes of cache on average when running maximum threads. With such a small footprint allotted to each thread, the advantages of data locality are lost due to increased cache contention. The detrimental effect of running large number of threads on cache hit rates in GPUs has been demonstrated. However, their solutions use architecture dependent heuristics that are not as effective across architectures. Another reason for inefficient execution is the rigidity of the core and memory system voltage and frequency operating points. For example, while the GDDR5 DRAM can provide a bandwidth of up to 6 Gbps, the idle standby current is 30% higher as compared to when it provides 3.2 Gbps. As the memory system is not utilized significantly for compute intensive kernels, there is an opportunity to save energy if the performance of memory system is lowered for such kernels without degrading performance. Similar opportunity is present for memory intensive kernels, if the core frequency and voltage can be lowered as SMs are not the bottleneck. The trade-off of saving energy by DVFS and core scaling for such cases has been analyzed, but does not provide a robust runtime mechanism to deal with all scenarios.

If the proclivity of a workload can be known a priori, advanced programmers can set the desired number of concurrent threads, frequency of the core and frequency of the memory system. However, static decisions are often infeasible due to three reasons. First, the contention for a hardware resource may be heavily dependent on the input. For example, a small input set might not saturate the memory bandwidth, whereas a large input set might. Second, resource contention is dependent on the amount of given GPU hardware resources and an application optimized for a GPU may change its point of contention on another GPU. Third, due to the prevalence of general purpose computing on GPUs (GPGPU), more irregular parallel applications are being targeted for GPUs. This has resulted in GPGPU kernels having distinct phases where different resources are in demand.

As running the maximum number of threads at fixed core and memory system frequency is not always the best solution and they cannot be determined a priori and independently, an intelligent runtime system is required. This system should be able to tune three important architectural parameters: number of threads, core frequency and memory frequency in a coordinated fashion as these parameters are dependent.

To address the limitations mentioned above and exploit the significant opportunities provided by modulating these three parameters, the present disclosure proposes Equalizer, a comprehensive dynamic system which coordinates these three architectural parameters. Based on the resource requirements of the kernel at runtime, it tunes these parameters to exploit any imbalance in resource requirements. As new GPU architectures support different kernels on each SM, Equalizer runs on individual SMs to make decisions tailored for each kernel. It monitors the state of threads with four hardware counters that measure the number of active warps (groups of threads), warps waiting for data from memory, warps ready to execute arithmetic pipeline and warps ready to issue to memory pipeline over an execution window. At the end of a window, Equalizer performs two actions to tune the hardware.

Firstly, it decides to increase, maintain, or decrease the number of concurrent threads on the SM. Secondly, it also takes a vote among different SMs to determine the overall resource requirement of the kernel based on the above counters. After determining the resource requirements of a kernel, Equalizer can work in either energy efficient or high performance modes. In the energy mode (e.g. as controlled by a mode flag), it saves energy by throttling under-utilized resources. As only the under-utilized resources are throttled, its performance impact is minimal. In the performance mode, the bottleneck resource is boosted to provide higher performance at modest energy cost. Equalizer can in some example embodiments achieve a net 15% energy savings while improving performance by 5% in the energy saving mode and achieves 22% performance improvement in the performance mode while consuming 6% additional energy across a spectrum of compute intensive, memory intensive and cache sensitive benchmarks. The performance characteristics discussed below are given by way of example only.

This disclosure addresses the following:
  the opportunity for energy savings and performance improvement that a dynamic adaptable system can achieve over a fixed GPU architecture for a variety of kernels that have sophisticated resource requirements.
  an analysis of the time spent by the warps present on an SM. Through this analysis, it introduces four novel hardware counters based on the execution state of the warps. These counters represent waiting warps, active warps, ready to execute memory warps, and ready to execute compute warps. They expose the collective resource utilization of the application to the concurrency management system.
  a comprehensive, low overhead runtime tuning system for GPUs that dynamically adapts the number of threads, core frequency and memory frequency for a given kernel in unified way to either save energy by throttling unused resources or improve performance by reducing cache contention and boosting the bottleneck resource.

Opportunities for a Dynamic System

In this section there are described various opportunities that a runtime system can exploit. The following considers 27 kernels from the Rodinia and Parboil benchmark suites and classify them into four categories on a NVIDIA Fermi style (GTX 480) architecture: 1) compute intensive which have contention for the compute units, 2) memory intensive which stress the memory bandwidth, 3) cache sensitive which have contention for L1 data cache and 4) unsaturated which do not saturate any of the resources but can have inclination for one of the resources.

Effect of Execution Parameters

Figure 4:
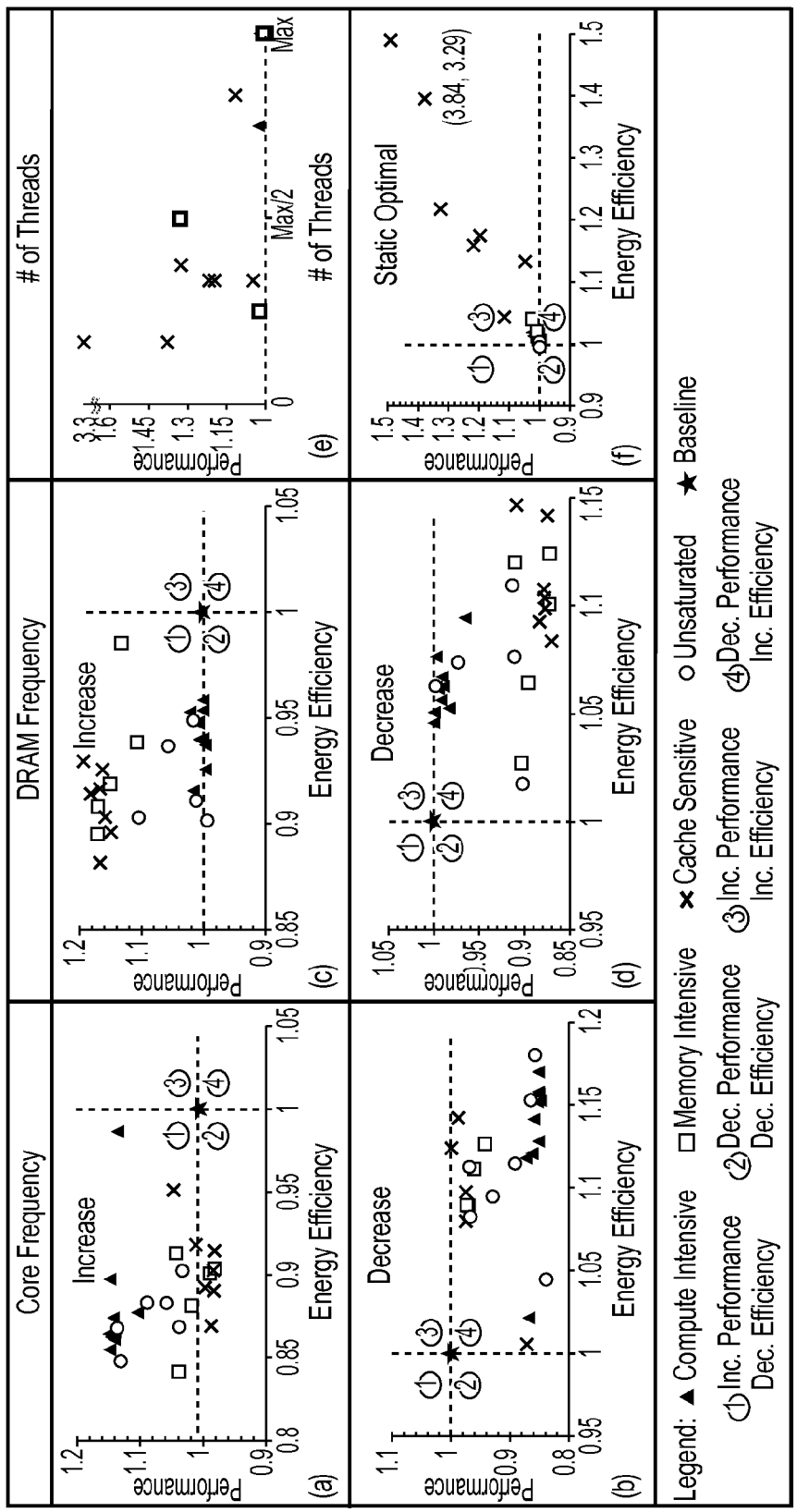
FIG. 4 illustrates the impact of variation of SM frequency, DRAM frequency and number of concurrent threads on performance and energy efficiency, the black start mark shows the value for the baseline GPU and is always set to 1 for both performance and energy and the properties of the four quadrants relative to the star mark are explained in the legend at the bottom.

FIG. 4 shows the impact of varying SM frequency, memory frequency and number of threads on the performance and energy efficiency of different kernels. Energy efficiency is defined as the ratio of energy consumed by the baseline Fermi architecture over the energy consumed by the modified system. Higher value of energy efficiency corresponds to lower energy consumption in the modified system. The kernels and methodology used for this experiment is described below. A black star mark on each subfigure shows the position of the baseline. The four quadrants 1, 2, 3 and 4 in the subfigures represent deviation from the black star. In quadrant 1, performance improves and efficiency decreases, while in quadrant 2 performance and efficiency decrease. In quadrant 3 performance and efficiency increase, while in quadrant 4 performance decreases and efficiency increases.

SM Frequency: FIG. 4a shows the impact of increasing the SM frequency by 15%. The compute kernels show proportional improvement in performance and increase in energy by moving deep into quadrant 1. The result for memory and cache kernels are very different. Since these kernels are not constrained by the SM, faster computations by increasing the SM frequency does not reduce any stalls. Therefore, for such kernels insignificant speedup is achieved and they stay close to the dotted line which represents baseline performance. Hence, increasing SM frequency is effective only for the compute kernels and should be avoided for other kernels.

On the other hand, when the SM frequency is reduced by 15%, the most affected kernels are compute kernels and they move significantly into quadrant 4 losing performance while saving energy (FIG. 4b). In such kernels, the SM's compute resources are the bottleneck and slowing the SM will slow these resources, reducing performance. While there is a significant reduction in the energy consumed, such large drops in performance are generally unacceptable. On the other hand, the loss in performance for memory and cache kernels is small, while the energy efficiency improves significantly, pushing the kernels into quadrant 4. The primary reason for this behaviour is the large periods of inactivity of the compute resources.

Memory Frequency: While SM frequency affects energy and performance of compute kernels, memory frequency has similar effects on memory kernels. Cache kernels behave like memory kernels due to cache thrashing, which leads to higher bandwidth consumption. FIG. 4c shows the impact of increasing the DRAM frequency by 15%. Memory and cache kernels move deep into quadrant 1 due to the improved performance. The decrease in energy efficiency is lower than increasing SM frequency as the memory contributes less significantly to the total energy. Analogous to the impact of SM frequency on memory kernels, increasing DRAM frequency does not impact compute kernels as the memory is not fully utilized at the base frequency. These kernels achieve no speedup and increase the energy consumption by 5%.

Decreasing the memory frequency affects the memory and cache kernels as shown by FIG. 4d. As memory bandwidth is the bottleneck for such kernels, this behavior is along expected lines. However, reducing DRAM frequency has no performance impact on compute kernels while increasing energy efficiency by 5%. This presents an opportunity to decrease the DRAM frequency and voltage for compute kernels.

Number of Thread Blocks: Increasing the DRAM frequency helps cache kernels get data back faster. However, controlling the number of threads to reduce L1 data cache thrashing will improve performance significantly with minimal energy increase. Therefore, we first analyze the optimal number of threads that need to run on an SM. FIG. 4e shows the best performance achieved by the kernels by varying the number of concurrent threads on an SM. The compute and memory kernels achieve best performance with maximum threads and overlap at (Max Threads, 1) as saturating these resources does not hurt performance significantly and only leads to inefficient execution. The best performance for the cache kernels is achieved at lower concurrency levels where there is less contention for the cache. Therefore the big challenge for a runtime system is to find the most efficient number of threads to run. Note that if threads less than optimal are run, there might not be sufficient parallelism to hide memory access latency, which will result in lower performance.

TABLE 1

Actions of different parameters for various objectives

| Kernel | Objective | SM Frequency | DRAM Frequency | Number of threads |
|---|---|---|---|---|
| Compute Intensive | Energy | Maintain | Decrease | Maximum |
| | Performance | Increase | Maintain | Maximum |
| Memory Intensive | Energy | Decrease | Decrease | Maximum |
| | Performance | Maintain | Increase | Maximum |
| Cache Sensitive | Energy | Maintain | Maintain | Optimal |
| | Performance | Maintain | Maintain | Optimal |

The algorithm to decide the number of concurrent threads should ensure that the number of threads are not reduced significantly for compute and memory kernels as performance might suffer due to the lack of work. FIG. 4f shows the improvement in energy efficiency, if the best performing number of concurrent threads are selected statically. There is significant improvement in performance and energy efficiency as kernels go high into quadrant 3. Therefore, choosing the best number of threads to run concurrently is suitable for saving energy as well as improving performance. For compute and memory kernels, best performance and energy efficiency is achieved by running maximum number of threads.

Actions for Dynamic System: The action of increasing, maintaining, or decreasing the three parameters depend on the objective of the user. If the objective is to save energy, the SM and memory frequency should be reduced for memory and compute kernels respectively. If the objective is to improve performance, the SM and memory frequency should be increased for compute and memory kernels respectively. Running the optimal number of threads blocks for cache sensitive cases is beneficial in both the objectives. These conditions and actions are summarized in Table 1.

Kernel Variations

Kernels not only show diverse static characteristics in the resources they consume, but their requirements also vary across and within invocations. FIG. 5a shows the distribution of execution time across various invocations of the bfs-2 kernel for three statically fixed number of thread blocks. All values are normalized to the total time taken for the kernel with maximum concurrent thread blocks (3). The performance of having 3 thread blocks is better than having 1 block until invocation number 7 (vertical stripes). But from invocation number 8 to 10 (horizontal stripes), having 1 block is better. After invocation 10, having 3 thread blocks is better again. An optimal solution would never pick the same number of blocks across all invocations. A 16% improvement in performance is possible by simply picking the ideal number of thread blocks for every invocation as shown by the bottom bar.

An example of variation in resource requirements within a kernel invocation is shown in FIG. 5b for the mri-g-1 benchmark. Over most of the execution time, there are more warps waiting for data to come back from memory than warps ready to issue to memory. However, for two intervals, there are significantly more warps ready to issue to memory, putting pressure on the memory pipeline. During these intervals, a boost to the memory system will relieve the pressure and significantly improve the performance.

Overall, there are significant opportunities for a system that can control the number of threads, SM frequency and memory frequency at runtime. These opportunities are present not only across different kernels, but also across a kernel's invocations and within a kernel's invocation. In the following section, we describe how Equalizer exploits these opportunities to save 3.

Equalizer

The goal of Equalizer is to adjust three parameters: number of thread blocks, SM frequency and memory frequency, to match the requirements of the executing kernels. To detect a kernel's requirement, Equalizer looks at the state of the already present active warps on an SM and gauges which resources are under contention. The state of active warps is determined by a collection of four values: 1) number of active warps, 2) number of warps waiting for a dependent memory instruction, 3) number of warps ready to issue to memory pipeline, and 4) number of warps ready to issue to arithmetic pipeline. Large values for the last two counters indicate that the corresponding pipelines are under pressure. At runtime, Equalizer periodically checks for contention of resources using the state of the warps. It makes a decision to increase, maintain or decrease the three parameters at the end of each execution window (epoch). If Equalizer decides to change any parameter, the new value differs from the previous value by one step. The details of the decision process are explained below.

FIG. 6 shows the interaction of Equalizer with the other components of a GPU. It receives the four counters mentioned above, from the warp scheduler in an SM and makes a local decision. If the decision is to increase number of threads, the GlobalWork Distribution Distribution Engine (GWDE) which manages thread block distribution across SMs, issues a new thread block for execution to the SM. If Equalizer decides to reduce the number of concurrent threads, it may use CTA Pausing technique as discussed below. Based on the objective of Equalizer, each SM submits a Voltage/Frequency (VF) preference to the Frequency Manager every epoch. The frequency manager shown in FIG. 6 receives these requests and makes a global decision for the new VF level for the SM and memory based on a majority function.

State of Warps

When a kernel executes on an SM, warps of the kernel can be in different states. We classify the warps into five categories depending on their state of execution in a given cycle:

Waiting—Warps waiting for an instruction to commit so that further dependent instructions can be issued to the pipeline are in this category. The majority of warps are waiting for a value to be returned from memory. The number of warps needed to hide memory latency is not only a function of the number of memory accesses made by the warps, but also of the amount of compute present per warp. An SM should run more than Waiting number of warps concurrently to effectively hide memory access latency.

Issued—Warps that issue an instruction to the execution pipeline are accounted here. It indicates the IPC of the SM and a high number of warps in this state indicate good performance.

Excess ALU ($X_{alu}$)—Warps that are ready for execution of arithmetic operations, but cannot execute due to unavailability of resources are in this category. These are ready to execute warps and cannot issue because the scheduler can only issue a fixed number of instructions per cycle. $X_{alu}$ indicates the excess warps ready for arithmetic execution.

Excess memory ($X_{mem}$)—Warps that are ready to send an instruction to the Load/Store pipeline but are restricted are accounted here. These warps are restricted if the pipeline is stalled due to back pressure from memory or if the maximum number of instructions that can be issued to this pipeline have been issued. $X_{mem}$ warps represents the excess warps that will increase the pressure on the memory subsystem from the current SM.

Others—Warps waiting on a synchronization instruction or warps that do not have their instructions in the instruction buffer are called Others. As there is no instruction present for these warps, their requirements can not be known.

In principle, one warp in $X_{alu}$ or $X_{mem}$ state denotes contention for resources. However, Equalizer boosts or throttles resources in discrete steps and in either cases, there should not be lack of work due to the modulation of parameters. Hence, there should be some level of contention present before Equalizer performs its actions.

FIG. 7 shows the distribution of three of the above states on an SM for the 27 kernels broken down by category, while running maximum concurrent threads. Others category is not shown as their resource requirements cannot be observed. The following observations are exhibited from the state of warps:

Compute intensive kernels have a significantly larger number of warps in $X_{alu}$ state as compared to other kernels.

Memory intensive and cache sensitive kernels have a significantly larger number of warps that are in $X_{mem}$ state as compared to the other categories.

All unsaturated kernels still have inclination for either compute or memory resources as they have significant fraction of warps in $X_{alu}$ or $X_{mem}$ state.

Unifying Actions on Memory Intensive and Cache Sensitive Kernels: As the state of the warps for memory intensive and cache sensitive kernels are similar, we unify the process of tuning the resources for the two cases. FIG. 8 shows the performance of memory intensive kernels with a varying number of thread blocks. All kernels saturate their performance well before reaching the maximum number of concurrent blocks. As long as the number of blocks for a memory intensive kernel is enough to keep the bandwidth saturated, we do not need to run the maximum number of blocks. In case the large number of warps in Xmem state were due to cache thrashing, this reduction in thread blocks will reduce cache contention.

In principle, if every cycle an SM sends a request that reaches DRAM, then as there are multiple SMs, the bandwidth will be saturated leading to back pressure at the SM. Therefore, the Load Store Unit(LSU) will get blocked and all warps waiting to access memory will stall. So even a single warp in $X_{mem}$ state is indicative of memory back pressure. However, when this $X_{mem}$ warp eventually sends its memory request, it might be hit in the L1 or L2 cache. Therefore the earlier $X_{mem}$ state of the warp was not actually representing excess pressure on DRAM and so we conservatively assume that if there are two warps in $X_{mem}$ state in steady state then the bandwidth is saturated. So Equalizer tries to run the minimum number of blocks that will keep the number of warps in $X_{mem}$ greater than two and keep the memory system busy and reduce L1 cache contention with minimum number of thread blocks.

```
Algorithm 1 Decision algorithm of Equalizer

1:            1> nMem, nALU are the number of warps in X_alu and X_mem state
 2:                      1> nWaiting is the number of warps in waiting state
 3:            1> nActive is the number of active, accounted warps on an SM
 4:                1> W_cta and numBlocks are # warps in a block and # blocks
 5:                      1> MemAction and CompAction are frequency changes
 6: ─────────────────────────────────────────────────────────────────────
 7: if nMem > W_cta then              1> Definitely memory intensive
 8:     numBlocks = numBlocks - 1
 9:     MemAction = true
10: else if nALU > W_cta then          1> Definitely compute intensive
11:     CompAction = true
12: else if nMem > 2 then                    1> Likely memory intensive
13:     MemAction = true
14: else if nWaiting > nActive/2 then          1> Close to ideal kernel
15:     numBlocks = numBlocks + 1
16:     if nALU > nMem then              1> Higher compute inclination
17:         CompAction = true
18:     else                               1> Higher memory inclination
19:         MemAction = true
20:     end if
21: else if nActive == 0 then
22:     CompAction = true                     1> Improve load imbalance
23: end if
```

Equalizer Decision

To exploit the tendencies of a kernel as indicated by the state of warps, we propose a dynamic decision algorithm for Equalizer. Once the tendencies are confirmed, the algorithm performs actions based on the two different objectives as mentioned in Table 1.

Due to imbalance in the kernel's resource requirements, one of the resources is saturated earlier than others and hence, several warps invariably end up in $X_{alu}$ or $X_{mem}$ state. Therefore, whenever Equalizer detects that $X_{alu}$ and $X_{mem}$ are beyond a threshold, it can declare the kernel to be compute or memory intensive. This threshold has to be conservatively high to ensure that the resources are not starved for work with changes in the three parameters that are considered.

If the number of warps in the $X_{alu}$ or $X_{mem}$ states are more than the number of warps in a thread block ($W_{cta}$), executing with one less thread block would not degrade the performance on average. These additional warps were stalled for resources in any case and the remaining warps were sufficient to maintain the high resource utilization. Therefore, $W_{cta}$ is a conservative threshold that guarantees contention of resources if number of warps in $X_{alu}$ or $X_{mem}$ are above it.

Tendency detection: Algorithm 1 shows Equalizer decision process that implements actions mentioned in Table 1. If the number of $X_{alu}$ or $X_{mem}$ warps are greater than $W_{cta}$, the corresponding resource can be considered to have serious contention (lines 7 and 10). If none of the two states have large number of excess warps, Equalizer checks the number of $X_{mem}$ warps to determine bandwidth saturation (line 12). As discussed above, having more than two $X_{mem}$ warps indicates bandwidth saturation. If these three conditions (compute saturation, heavy memory contention and bandwidth saturation) are not met, there is a chance that the current combination of the three parameters are not saturating any resources and these kernels are considered to be unsaturated. In this case, if a majority of the warps are not waiting for data (line 14), Equalizer considers these kernels to be degenerate and does not change any parameters. Kernels in unsaturated category can have compute or memory inclinations depending on large $X_{alu}$ or $X_{mem}$ values (line 16-18).

Equalizer actions: After determining the tendency of the kernel, Equalizer tunes the hardware parameters to achieve the desired energy/performance goals. For compute intensive kernels, Equalizer requests CompAction from the frequency manager (line 11). Equalizer deals with the memory intensive workloads as explained above. Whenever Equalizer finds that the number of $X_{mem}$ warps are greater than $W_{cta}$, it reduces the number of blocks by one (line 8) using the techniques discussed below. Reducing the number of concurrent blocks in this fashion does not hamper the memory kernels and it can help reduce cache contention. However, if the number of $X_{mem}$ warps are greater than two, but less than $W_{cta}$, Equalizer does not decrease the number of blocks (line 12-13) because reducing number of thread blocks might under-subscribe the memory bandwidth as explained above. In both of these cases, Equalizer requestsMemAction from the frequency manager. For unsaturated and non-degenerate kernels, Equalizer requests CompAction or MemAction depending on their compute or memory inclination (line 16-18).

CompAction and MemAction in Algorithm 1 refer to the action that should be taken with respect to SM and memory frequency when compute kernels and memory kernels are detected, respectively. As per Table 1, for compute kernels, if the objective of Equalizer is to save energy, then it requests the frequency manager in FIG. 6 to reduce memory VF. If the objective is to improve performance then Equalizer requests increase in the SM's VF. The opposite actions are taken for memory kernels as per Table 1. Equalizer also provides a unique opportunity for imbalanced kernel invocations. If the kernel has a few long running thread blocks that do not distribute evenly across the SMs, then certain SMs might finish early and other SMs will finish late due to load imbalance. If all warps in a SM are idle but the overall GPU is in high power state, Equalizer performs an action similar to compute kernels (line 21). It tries to finish the work early (line 21) or reduce memory energy. The assumption is that since majority of the SMs are idle and leaking energy, finishing the work early will compensate for the increase in energy due to reduction in leakage energy. In energy saving mode, having lower bandwidth will likely be sufficient for sustaining performance as the majority of the SMs are idle.

Equalizer Hardware Design

In the baseline Fermi GPU, there are two entries for every warp in the instruction buffer. During every cycle, a scheduler selects a warp for execution using a scheduling policy. In this process, the warp instruction's operands are checked in the scoreboard for readiness. If a warp instruction is ready for execution, it is sent to the issue stage. Equalizer monitors the state of the instructions in the instruction buffer to determine about the state of warps. FIG. 9 shows the details of Equalizer on an SM. Every 128 cycles, Equalizer goes through the head instructions of every warp in the buffer and collects the status of each warp. This process is continued throughout the epoch window at which point a decision is made by Equalizer.

Counter Implementation

Whenever a thread block is paused, the entries in the instruction buffer for the warps of that thread block are not considered for scheduling. In FIG. 9, the dark grey entries in the instruction buffer are not considered for scheduling. The status of only unpaused warps are taken into account in the decision by Equalizer. If a warp is unpaused and it does not have a valid entry in the instruction buffer, it is considered as unaccounted. The four counters needed for Equalizer mentioned above are implemented as follows:

Active warps: This counter is implemented by counting the number of warps that are not paused or unaccounted.

Waiting warps (waiting characteristic): The head instructions of every warp that cannot be executable because the scoreboard has not made the operands available are considered for this counter.

$X_{alu}$ (computation—limited characteristic): All the head instructions waiting to issue to the arithmetic pipeline that have operands available from the scoreboard are accounted here.

$X_{mem}$ (memory-limited characteristic): All the warps instructions that are ready to access memory but cannot be issue because the LD/ST queue cannot accept an instruction in this cycle are in this category.

Thread Block Allocation Mechanism

After the collection of counter values, at the end of an epoch window, Equalizer uses the algorithm explained above and decides to increase, maintain or decrease thread blocks (numBlocks). Equalizer does not change numBlocks on the basis of one window. If the decision of three consecutive epoch window results in different decision than the current numBlocks, then Equalizer changes numBlocks. This is done to remove spurious temporal changes in the state of the warps by the decision itself. The SM interacts with the GWDE to request more thread blocks whenever required as shown in FIG. 6. If Equalizer decides to increase the number of thread blocks, it will make a request to GWDE for another thread block. In case, Equalizer decides to reduce the number of thread blocks, it sets the pause bit on the instruction buffer of all warps in that block corresponding warps' instruction buffer. After one of the active thread blocks finishes execution, Equalizer unpauses a thread block from the paused thread block. At this point, Equalizer does not make a new request to the GWDE. This automatically maintains the reduced numBlocks.

Frequency Management

At the end of each epoch, every SM calculates whether to increase, maintain or decrease its SM or memory system frequency based on the CompAction and MemAction values of Algorithm 1 in conjunction with Table 1. The frequency manager shown in FIG. 6, receives these requests and makes a decision based on the majority vote amongst all the SM requests. If the request is to change SM VF level then the decision is sent to the on-chip or off-chip voltage regulator. If the request is to change the memory system VF level then, the operating points of the entire memory system which includes the interconnect between SMs and L2, L2, memory controller and the DRAM are changed. In this work, three discrete steps for each voltage/frequency domain are considered. The normal state refers to no change in frequency, low state and high state is reduction and increase in nominal frequency by 15% Any increase or decrease in the frequency is implemented in a gradual fashion between the three steps. For example, if the decision is to increase the SM frequency in the current epoch and the current SM frequency is in the low state then it is change to normal in first step. If in the next epoch the same request is made then the frequency is increased from normal to high.

Experimental Evaluation

Methodology

Table 2 describes the various applications, their kernels and characteristics. These kernels are from the Rodinia suite and Parboil. The kmeans benchmark uses large input. We use GPGPUSim v3.2.2, a cycle level GPU simulator and model the Fermi Architecture. The configurations for GTX480 are used. The important configuration parameters of the GPU are shown in Table 3.

Energy Modelling GPUWattch is used as a baseline power simulator. It is enhanced to enable dynamic voltage and frequency scaling on the SM and the memory. GPUWattch creates a processor model and uses static DRAM.

TABLE 2

Benchmark Description

| Application | Id | Type | Kernel Fraction | num Blocks | $W_{cta}$ |
|---|---|---|---|---|---|
| backprop(bp) | 1 | Unsaturated | 0.57 | 6 | 8 |
| | 2 | Cache | 0.43 | 6 | 8 |
| bfs | 1 | Cache | 0.95 | 3 | 16 |
| cfd | 1 | Memory | 0.85 | 3 | 16 |
| | 2 | Memory | 0.15 | 3 | 6 |
| cutcp | 1 | Compute | 1.00 | 8 | 6 |
| histo | 1 | Cache | 0.30 | 3 | 16 |
| | 2 | Compute | 0.53 | 3 | 24 |
| | 3 | Memory | 0.17 | 3 | 16 |
| kmeans(kmn) | 1 | Cache | 0.24 | 6 | 8 |
| lavaMD | 1 | Compute | 1.00 | 4 | 4 |
| lbm | 1 | Memory | 1.00 | 7 | 4 |
| leukocyte(leuko) | 1 | Memory | 0.64 | 6 | 6 |
| | 2 | Compute | 0.36 | 8 | 6 |
| mri-g | 1 | Unsaturated | 0.68 | 8 | 2 |
| | 2 | Unsaturated | 0.07 | 3 | 8 |
| | 3 | Compute | 0.13 | 6 | 8 |
| mri-q | 1 | Compute | 1.00 | 5 | 8 |
| mummer(mmer) | 1 | Cache | 1.00 | 6 | 8 |
| particle(prtcl) | 1 | Cache | 0.45 | 3 | 16 |
| | 2 | Compute | 0.55 | 3 | 16 |
| pathfinder | 1 | Compute | 1.00 | 6 | 8 |
| sad | 1 | Unsaturated | 0.85 | 8 | 2 |
| sgemm | 1 | Compute | 1.00 | 6 | 4 |
| sc | 1 | Unsaturated | 1.00 | 3 | 16 |
| spmv | 1 | Compute | 1.00 | 8 | 6 |
| stencile(stncl) | 1 | Unsaturated | 1.00 | 5 | 4 |

TABLE 3

Simulation Parameters

| | |
|---|---|
| Architecture | Fermi (15 SMs, 32 PE/SM) |
| Max Thread Blocks:Warps | 8:48 |
| Data Cache | 64 Sets, 4 Way, 128 B/Line |
| SM V/F Modulation | ±15%, on-chip regulator |
| Memory V/F Modulation | ±15% | coefficients for every DRAM active, precharge and access command. We create five different processor models (normal, SM high, SM low, memory high and memory low) for the five models that are simulated. At runtime, the timing simulation statistics are passed on to the appropriate processor. The current Kepler GPUs can boost the SM frequency by 15% and we chose 15% as the change in GPU VF level. We assume linear change in voltage for any change in the frequency. Furthermore, we integrate the SM and leakage calculation into GPUWattch for the different processors. We assume the baseline GPU to have a leakage of 41.9 W. It has been shown that the voltage guardbands on NVIDIA GPUs are more than 20% and therefore reducing both voltage and frequency by 15% is possible.

On the GPU, the SM works on a specific voltage frequency domain and the network on chip, L2 cache, memory controller and DRAM operate on separate domains. When we change the memory system VF level, we also change the network, L2 and the memory controller's operating point. For all these, GPUWattch uses the integrated McPAT model. For DRAM modelling, we use the various operating points of the Hynix GDDR5. The major factor that causes the difference in power consumption of DRAM is the active standby power (when the DRAM is inactive due to lack of requests). We use the different values of Idd2n along with the operating voltage, which is responsible for active standby power. Commercial Kepler GPUs already allow memory voltage/frequency to change by significant amount but we restrict the changes conservatively to 15%. However, due to lack of public knowledge of the decision making process of the Kepler GPUs, we do not compare with these methods.

For the results discussed below, there is assumed an on-chip voltage regulator module (VRM). This module can change the VF level of the SMs in 512 SM cycles. A per SM VRM is not assumed, as the cost may be prohibitive. This might lead to some inefficiency if multiple kernels with different resource requirements are running simultaneously. In such cases, per SM VRMs should be used.

Equalizer Power Consumption Equalizer has two stages in hardware. The first stage collects statistics and the second stage makes a decision. We show that the overall power consumption of Equalizer is insignificant as compared to SM power consumption. For the first part, Equalizer introduces 5 new counters. The active, waiting, $X_{alu}$ and $X_{mem}$ counters can have maximum values of 48 (total number of warps) per sample. After sensitivity study, it was found that for a 4096 cycle epoch window, the average behavior of the kernel starts to match the macro level behavior and is not spurious. As a sample is taken every 128 cycles for the epoch window, there will be 32 samples in an epoch and hence the maximum value of these counters can be 1536 (48 times 32). So, an 11 bit counter is sufficient for one counter. A cycle counter which will run for 4096 cycles and reset is also needed for Equalizer. Overall, 4 11-bit counters, and 1 12-bit counter are needed for the statistics collection process. We expect this area overhead to be insignificant as compared to the overall area of 1 SM, which includes 32 FPUs, 32768 registers, 4 SFUs, etc. The Equalizer decision process is active only once in an epoch window of 4096 cycles. The cycle counter explained above will signal the Equalizer decision process to begin, but as the process happens infrequently, we assume the decision calculation to consume insignificant amount of energy.

Results

The results of Equalizer as shown in performance mode and energy mode for the four kernel categories in FIGS. 10 and 11 as compared to the baseline GPU. The top chart in both the figure shows the performance and the bottom chart shows the impact on energy. The two charts in each figure are aligned and use the same X-axis legends. The bars show the data for Equalizer, changing SM and memory frequency statically by 15%. At runtime, equalizer modulates the number of threads and either changes SM frequency or memory frequency depending on the kernel's present requirements.

Performance Mode: The results for performance mode in FIG. 10 show that Equalizer makes the right decision almost every time and matches the performance of the best of the two static operating points for compute and memory kernels. The performance improvement of Equalizer for compute kernels is 13.8% and for memory kernels a 12.4% speedup is achieved, showing proportional returns for the 15% increase in frequency. The corresponding increase in energy for Equalizer is shown in the bottom chart in FIG. 10. For compute and memory kernels this increase is 15% and 11% respectively as increasing SM frequency causes more energy consumption. The increase in overall GPU energy is not quadratic whe increasing SM frequency as a large fraction of the total energy is due to leakage energy which does not increase with SM VF level. Equalizer is unable to detect the right resource requirement for leuko-1 kernel as it heavily uses texture caches which can handle a lot more outstanding request than regular data caches. This results in large number of requests going to the memory subsystem and saturating it without the back pressure being visible to LD/ST pipeline. This increases the overall energy consumption for memory kernels.

For cache sensitive kernels, the geometric mean of the speedup is 54%. Apart from the 17% improvement that these kernels receive by boosting memory frequency alone as shown by the memory boost geometric mean, the reduction in cache miss rate is the major reason for the speedup. The reduction in cache miss rate improves performance as the exposed memory latency is decreased and it also reduces the pressure on the bandwidth thereby allowing streaming data to return to the SM faster. The large speedup leads to improved performance and less leakage as the kernel finishes significantly faster and there is an overall reduction in energy by 11%. In fact, Kmeans achieves a speedup of 2.84× and up to 67% reduction in energy in the performance mode.

Among the unsaturated kernels, Equalizer can beat the best static operating point in mri_g-1, mri_g-2, sad-1 and sc kernels due to its adaptiveness. Equalizer captures the right tendency for bp-1 and stncl. prtcl-2 in the compute kernels has imbalanced blocks, with only one block running for more than 95% of the time. By accelerating the SM frequency for such a kernel, we save significant leakage leading to less overall energy increase even after increasing frequency. Overall, Equalizer achieves a speedup of 22% over the baseline GPU with 6% higher energy consumption. Always boosting SM frequency leads to 7% speedup with 12% energy increase and always boosting memory frequency leads to 6% speedup with 7% increase in energy. So, Equalizer provides better performance improvement at a lower increase in energy.

Energy Mode: The results for energy mode are shown in FIG. 11. SM Low and Mem Low denote the operating points with 15% reduction in frequency for SM and memory respectively. As shown in the figure, Equalizer adapts to the type of the kernel and reduces memory frequency for compute kernels and SM frequency for memory kernels and as the bottlenecked resource is not throttled, the loss in performance for compute and memory kernels is 0.1% and 2.5% respectively. For cache sensitive kernels, reducing thread blocks improves the performance by 30% due to reduced L1 data cache contention. This improvement is lower in energy mode as compared to performance mode because instead of increasing the memory frequency, Equalizer decides to lower the SM frequency to save energy. Even for the unsaturated kernels, reducing frequency by Equalizer loses performance only in stncl. This is because it has very few warps in $X_{mem}$ or $X_{alu}$ state as shown in FIG. 7 and hence decreasing frequency of any of the resources makes that resource under perform. Overall, the geometric mean of performance shows a 5% increase for Equalizer whereas lowering SM voltage/frequency and memory voltage/frequency by 15% leads to a performance loss of 9% and 7% respectively.

In the bottom chart of FIG. 11, only two bars are shown. The first bar shows the energy savings for Equalizer and the second bar shows the same for either SM low or mem low from the above chart, depending on which parameter results in no more than 5% performance loss and is called static best. The savings of Equalizer for compute kernels is 5% as reducing memory frequency cannot provide very high savings. However, memory kernels save 11% energy by lowering SM frequency. For cache sensitive kernels the energy savings for Equalizer is 36%, which is larger than performance mode's energy savings. This is due to throttling SM frequency rather than boosting memory frequency. For unsaturated kernels the trend of their resource utilization is effectively exploited by Equalizer with 6.4% energy savings even though there was an overall performance loss of 1.3%. Overall Equalizer dynamically adjusts to the kernel's requirement and saves 15% energy without losing significant performance, while the static best voltage/frequency operating point saves 8% energy.

Equalizer Analysis: To analyze the reasons for the gains of Equalizer in energy and performance mode, we show the distribution of various SM and memory frequency operating points for all the kernels. Normal, high and low modes are explained above. The P and E below each kernel denotes the distribution for performance and energy mode for a kernel respectively. For compute kernels, the P mode mostly has SM in high frequency and in E mode the memory is in low frequency. Similarly for cache and memory kernels the memory is at high frequency in P mode and SM is in low frequency in E mode. Kernels like histo-3, mri_g-1, mrig_g-2, and sc in the unsaturated category try to exploit the different phases and spend significant time in boosting both the resources at different times showing the adaptiveness of Equalizer.

The performance of Equalizer is compared with dynCTA a heuristics based technique to control the number of thread blocks and CCWS which controls the number of warps that can access data cache. Results are shown only for cache sensitive kernels as these two techniques are mostly effective only for these cases. DynCTA gets 22% speedup and CCWS can get up to 38% speedup. The reason why Equalizer is better than dynCTA for cache sensitive kernels is explained later while focusing on adaptiveness of Equalizer. While CCWS gets better speedup than Equalizer in mmer, Equalizer gets 16% better performance than CCWS. The performance of CCWS is sensitive to the size of the victim tags and the locality score cutoffs and is not as effective on the kernels that are not highly cache sensitive.

Equalizer adaptiveness: The impact of adaptability of Equalizer is demonstrated for inter-instance variation and intra instance variations in FIG. 14.

The stacked bars for 1, 2, 3 and the optimal number of blocks were shown in FIG. 5a. Another bar for Equalizer is added for comparison to that figure and shown in FIG. 14a. To analyze only the impact of controlling the number of blocks the frequencies are not varied in this experiment. The optimal solution for this kernel would change number of blocks after instance 7 and 10. Equalizer makes same choices but needs more time to decrease the number of blocks as it must wait for 3 consecutive decisions to be different from the current one to enforce a decision. Overall, the performance gain of Equalizer is similar to the Optimal solution. FIG. 14b shows the adaptiveness of Equalizer within an instance of the spmv kernel. We also compare the dynamism of Equalizer with dynCTA. Initially, spmv has low compute and high cache contention and therefore less warps are in the waiting state. Both Equalizer and dynCTA reduce the number of thread blocks to relieve the pressure on the data cache. After the initial phase, the number of warps waiting for memory increases as shown in the figure. While Equalizer adjusts to this nature and increases number of blocks, dynCTA's heuristics do not detect this change and thus do not increase thread blocks leading to poor performance. Across the cache sensitive kernels, we found that performance differences occurs because Equalizer is more adaptive and can accurately measure resource utilization as shown for spmv. However, for kernels that have more stable behavior, the performance of Equalizer and dynCTA is closer (e.g., bp-2 and kmn).

The high degree of multi-threading on GPUs leads to contention for resources like compute units, memory bandwidth and data cache. Due to this contention, the performance of GPU kernels will often saturate. Furthermore, this contention for resources varies across kernels, across invocations of the same kernel, and within an invocation of the kernel. In this disclosure there is provided a dynamic runtime system that observes the requirements of the kernel and tunes number of thread blocks, SM and memory frequency in a coordinated fashion such that hardware matches kernel's requirements and leads to efficient execution. By observing the state of the warps through four new hardware performance counters, Equalizer dynamically manages these three parameters. This matching of resources on the GPU to the executing kernel at runtime leads to an energy savings of 15% or 22% performance improvement.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus comprising:
processing circuitry to process a plurality of threads in a plurality of thread groups, a given thread group comprising a plurality of threads processable in parallel with a common program executable for each thread of said given thread group, wherein said processing circuitry comprises:
issue queue circuitry to store data specifying program instructions of said threads awaiting issue for execution;
instruction characterisation circuitry to determine one or more characteristics of said program instructions of said threads awaiting issue; and
operating parameter control circuitry to alter one or more operating parameters controlling operation of said apparatus in dependence upon said one or more characteristics,
wherein said one or more characteristics comprise one or more of:
a waiting characteristic indicative of a number of program instructions that are waiting for at least one input operand, that is an output operand of another instruction, to be committed before they are ready for issue;
a computation-limited characteristic indicative of a number of non-memory-accessing program instructions that are ready for issue and are waiting for availability of non-memory-accessing processing circuitry before they are able to issue; and
a memory-limited characteristic indicative of a number of memory-accessing program instructions that are ready for issue and are waiting for availability of memory-accessing processing circuitry before they are able to issue.

2. The apparatus as claimed in claim 1, wherein said non-memory-accessing processing circuitry comprises processing circuitry to perform arithmetical and logical processing operations.

3. The apparatus as claimed in claim 1, wherein said memory-accessing processing circuitry comprises one or more of a load/store unit, a cache memory and a main memory.

4. The apparatus as claimed in claim 1, wherein said one or more operating parameters comprise one or more of:
an operating frequency of non-memory-accessing processing circuitry;
an operating voltage of non-memory-accessing processing circuitry;
an operating frequency of memory-accessing processing circuitry;
an operating voltage of memory-accessing processing circuitry; and
a number of thread groups processable in parallel.

5. The apparatus as claimed in claim 1, comprising scoreboard circuitry to store scoreboard data comprising register-ready scoreboard data indicative whether respective operand registers are ready to provide input operands to said program instructions awaiting issue.

6. The apparatus as claimed in claim 5, wherein said scoreboard data comprises memory-access scoreboard data indicative of whether respective operand registers are waiting to be written by a pending memory access processing operation.

7. The apparatus as claimed in claim 5, wherein said one or more characteristics comprise:
a waiting characteristic indicative of a number of program instructions that are waiting for at least one input operand, that is an output operand of another instruction, to be committed before they are ready for issue; and wherein said instruction characterisation circuitry uses said register-ready scoreboard data to determine said number of program instructions that are waiting for at least one input operand.

8. The apparatus as claimed in claim 6, wherein said one or more characteristics comprise:

a computation-limited characteristic indicative of a number of non-memory-accessing program instructions that are ready for issue and are waiting for availability of non-memory-accessing processing circuitry before they are able to issue; and wherein said instruction characterisation circuitry uses said register-ready scoreboard data and said memory-access scoreboard data to determine said number of program instructions that are waiting for availability of non-memory-accessing processing circuitry.

9. The apparatus as claimed in claim 6, wherein said one or more characteristics comprise:

a memory-limited characteristic indicative of a number of memory-accessing program instructions that are ready for issue and are waiting for availability of memory-accessing processing circuitry before they are able to issue; and wherein said instruction characterisation circuitry uses said register-ready scoreboard data and said memory-access scoreboard data to determine said number of program instructions that are waiting for availability of memory-accessing processing circuitry.

10. The apparatus as claimed in claim 1, wherein said operating parameter control circuitry serves to reduce a number of thread groups processable in parallel if said number of memory-accessing program instructions that are ready for issue and are waiting for availability of memory-accessing processing circuitry before they are able to issue exceeds a threshold corresponding to a thread block threshold number.

11. The apparatus as claimed in claim 10, wherein said operating parameter control circuitry serves to increase processing performance of said memory-accessing processing circuitry relative to said non-memory-accessing processing circuitry if said number of memory-accessing program instructions that are ready for issue and are waiting for availability of memory-accessing processing circuitry before they are able to issue exceeds a threshold corresponding to a thread block threshold number.

12. The apparatus as claimed in claim 11, wherein said operating parameter control circuitry serves to increase processing performance of said non-memory-accessing processing circuitry relative to said memory-accessing processing circuitry if said number of non-memory-accessing program instructions that are ready for issue and are waiting for availability of non-memory-accessing processing circuitry before they are able to issue exceeds a threshold corresponding to a thread block threshold number.

13. The apparatus as claimed in claim 10, wherein said operating parameter control circuitry serves to increase processing performance of said memory-accessing processing circuitry relative to said non-memory-accessing processing circuitry if said number of memory-accessing program instructions that are ready for issue and are waiting for availability of memory-accessing processing circuitry before they are able to issue exceeds a threshold corresponding to a memory-limited threshold number that is less than said thread block threshold number.

14. The apparatus as claimed in claim 11, wherein said operating parameter control circuitry serves to increase a number of thread groups processable in parallel if said number of program instructions that are waiting for at least one input operand, that is an output operand of another instruction, to be committed before they are ready for issue exceeds more than a predetermined multiple of a number of said program instructions awaiting issue.

15. The apparatus as claimed in claim 14, wherein if said number of program instructions that are waiting for at least one input operand, that is an output operand of another instruction, to be committed before they are ready for issue exceeds more than a predetermined multiple of a number of said program instructions awaiting issue; and said number of non-memory-accessing program instructions that are ready for issue and are waiting for availability of non-memory-accessing processing circuitry before they are able to issue exceeds said number of memory-accessing program instructions that are ready for issue and are waiting for availability of memory-accessing processing circuitry before they are able to issue, then said operating parameter control circuitry serves to increase processing performance of said non-memory-accessing processing circuitry relative to said memory-accessing processing circuitry.

16. The apparatus as claimed in claim 14, wherein if said number of program instructions that are waiting for at least one input operand, that is an output operand of another instruction, to be committed before they are ready for issue exceeds more than a predetermined multiple of a number of said program instructions awaiting issue; and said number of non-memory-accessing program instructions that are ready for issue and are waiting for availability of non-memory-accessing processing circuitry before they are able to issue does not exceed said number of memory-accessing program instructions that are ready for issue and are waiting for availability of memory-accessing processing circuitry before they are able to issue, then said operating parameter control circuitry serves to increase processing performance of said memory-accessing processing circuitry relative to said non-memory-accessing processing circuitry.

17. The apparatus as claimed in claim 11, wherein a mode flag controls whether said operation parameter control circuitry serves to increase processing performance of said memory-accessing processing circuitry relative to said non-memory-accessing processing circuitry by either increasing performance of said memory-accessing processing circuitry or decreasing performance of said non-memory-accessing processing circuitry.

18. An apparatus comprising:

processing means for processing a plurality of threads in a plurality of thread groups, a given thread group comprising a plurality of threads processable in parallel with a common program executable for each thread of said given thread group, wherein said processing circuitry comprises:

issue queue means for storing data specifying program instructions of said threads awaiting issue for execution;

instruction characterisation circuitry for determining one or more characteristics of said program instructions of said threads awaiting issue; and operating parameter control means for altering one or more operating parameters controlling operation of said apparatus in dependence upon said one or more characteristics, wherein said one or more characteristics comprise one or more of:

a waiting characteristic indicative of a number of program instructions that are waiting for at least one input operand, that is an output operand of another instruction, to be committed before they are ready for issue;

a computation-limited characteristic indicative of a number of non-memory-accessing program instructions that are ready for issue and are waiting for availability of non-memory-accessing processing circuitry before they are able to issue; and a memory-limited characteristic indicative of a number of memory-accessing program instructions that are ready for issue and are waiting for availability of memory-accessing processing circuitry before they are able to issue.

19. A method comprising the steps of:

processing a plurality of threads in a plurality of thread groups, a given thread group comprising a plurality of threads processable in parallel with a common program executable for each thread of said given thread group, wherein said processing circuitry comprises:

storing data specifying program instructions of said threads awaiting issue for execution;

determining one or more characteristics of said program instructions of said threads awaiting issue; and altering one or more operating parameters controlling operation of an apparatus for processing said plurality of threads in dependence upon said one or more characteristics, wherein said one or more characteristics comprise one or more of:

a waiting characteristic indicative of a number of program instructions that are waiting for at least one input operand, that is an output operand of another instruction, to be committed before they are ready for issue;

a computation-limited characteristic indicative of a number of non-memory-accessing program instructions that are ready for issue and are waiting for availability of non-memory-accessing processing circuitry before they are able to issue; and a memory-limited characteristic indicative of a number of memory-accessing program instructions that are ready for issue and are waiting for availability of memory-accessing processing circuitry before they are able to issue.

* * * * *